Jan. 24, 1939.    J. W. JAGERSBERGER    2,145,008
NO-ROLL BACK MECHANISM
Filed Dec. 14, 1936    3 Sheets-Sheet 1
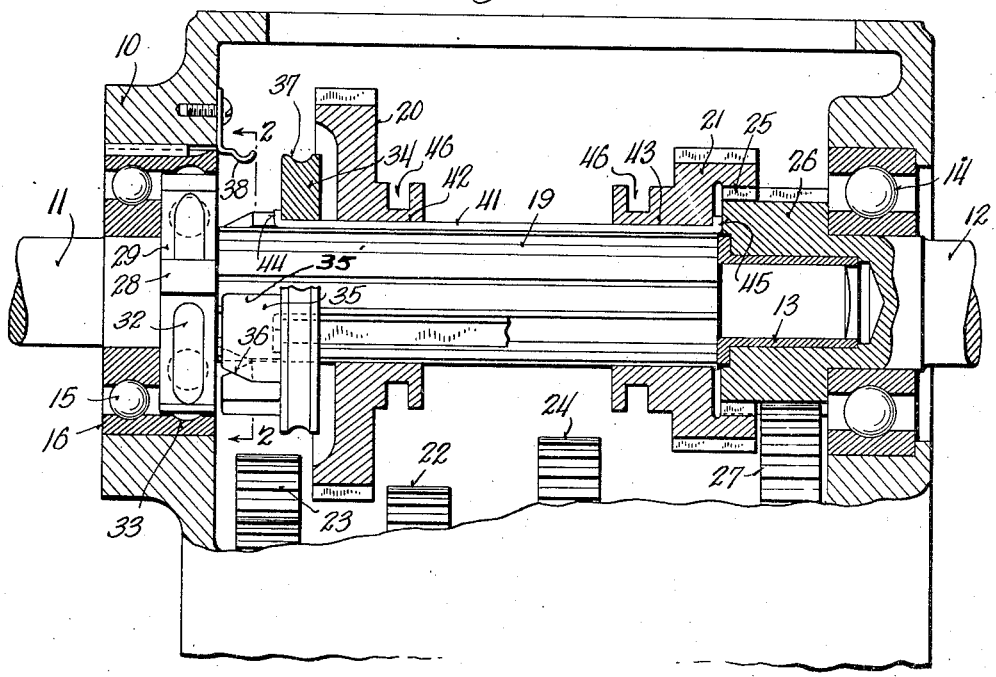
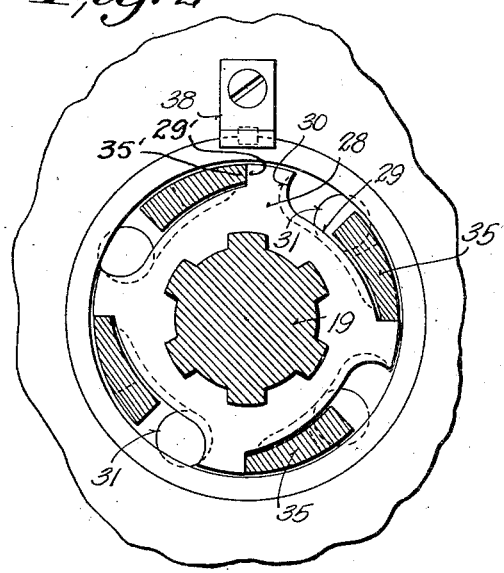
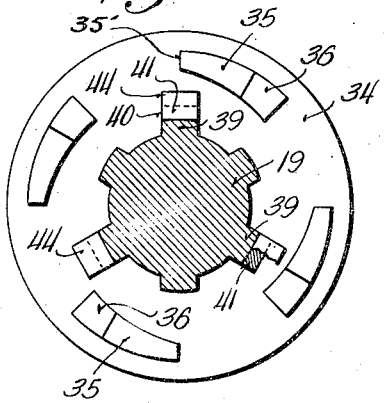
INVENTOR
Joseph W. Jagersberger
BY
Quarles & French
ATTORNEYS Jan. 24, 1939.   J. W. JAGERSBERGER   2,145,008
NO-ROLL BACK MECHANISM
Filed Dec. 14, 1936    3 Sheets-Sheet 3

INVENTOR
Joseph W. Jagersberger
BY
Quarles & French
ATTORNEYS

Patented Jan. 24, 1939

2,145,008

UNITED STATES PATENT OFFICE 2,145,008

NO-ROLL BACK MECHANISM

Joseph W. Jagersberger, Racine, Wis., assignor, by mesne assignments, to Standard Foundry Company, Racine, Wis., a corporation of Wisconsin Application December 14, 1936, Serial No. 115,709

1 Claim. (Cl. 192—4)

The invention relates to anti-roll back mechanism for automatically preventing a vehicle from rolling backward when parked on a hill or incline.

The object of the invention is to provide a no-roll back mechanism of very simple construction whose operation is under the control of the operator of the vehicle through his operations in shifting the transmission gears. According to the present invention the one way locking mechanism acts automatically to lock the drive shaft against rotation when as in rolling backwards down hill there is a tendency to rotate the drive or transmission shaft in a reverse direction. This automatic lock may thereafter be released when the reverse gear is engaged but cannot again be rendered operative until the transmission is put in high gear. This makes a more foolproof construction than those heretofore proposed since the locking out or release of the automatic lock when the transmission is in reverse or its lower gear ratios permits the vehicle being rocked back and forth as in getting out of a mudhole or snow bank while shifting from reverse to low and back again without danger of breaking parts of the driving mechanism through the carelessness of the operator.

A further object of the invention is to provide a no-roll back mechanism in which the locking is automatically effected and the control of the release is effected by lost motion connections with the reverse gear and the high speed or direct drive clutch connection.

A further object of the invention is to provide a no-roll back mechanism that can be readily incorporated in the present standard transmissions without any major mechanical changes.

A further object of the invention is to provide a no-roll back mechanism which requires no adjustment, is free of springs, has a minimum contact when running free so that the chance for wear of the parts is greatly reduced and there is practically no power loss through the device and in which the locking elements only make direct contacts when the vehicle stops.

A further object of the invention is to provide a no-roll back mechanism which is kept oiled by the oil in the transmission and in which the locking elements run on an oil film.

The invention further consists in the several features hereinafter set forth and more particularly defined by claim at the conclusion hereof.

In the drawings:

Fig. 1 is a vertical sectional view through a transmission having the no-roll back mechanism embodying the invention incorporated therein, the gearing being shown in high gear or direct drive;

Fig. 2 is a detail sectional view taken on the line 2—2 of Fig. 1;

Fig. 3 is a front end view of the release member, the shaft being shown in section;

Figure 4:
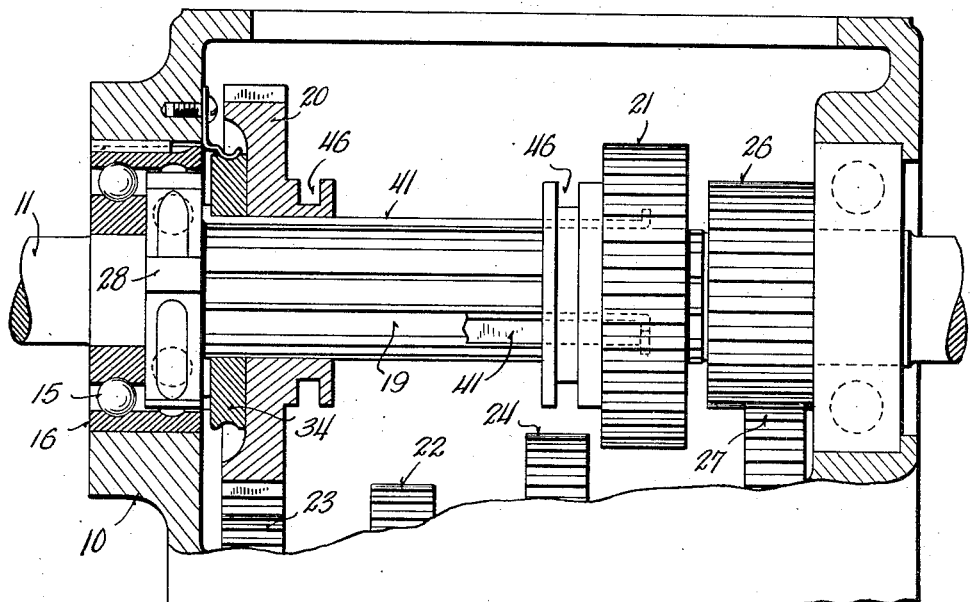
Fig. 4 is a view similar to Fig. 1 showing the parts in a release position with the transmission in reverse.
Figure 5:
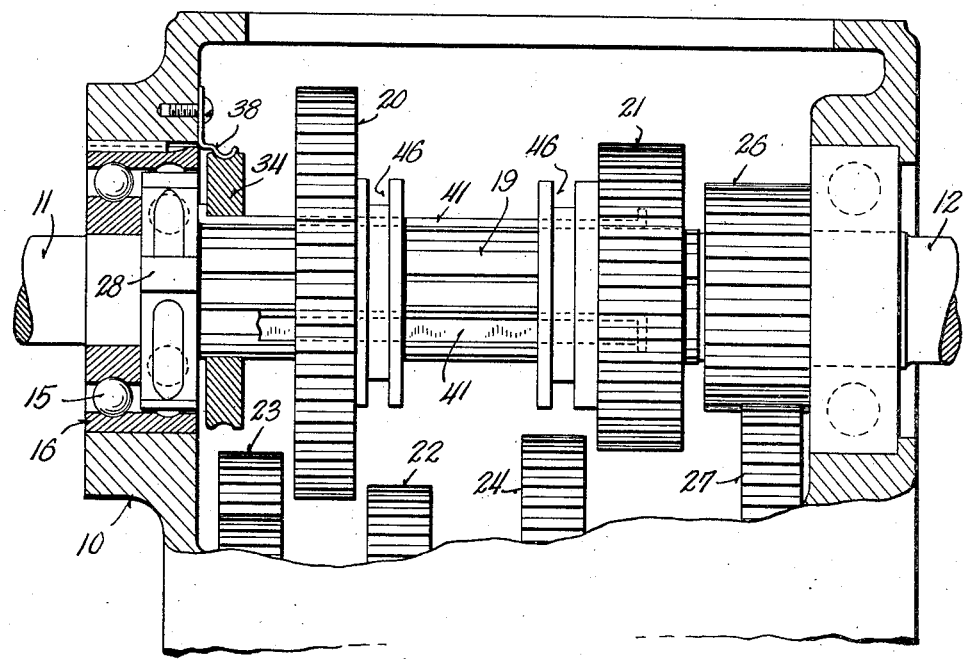
Fig. 5 is a view similar to Fig. 1 with the gearing in neutral position.
Figure 6:
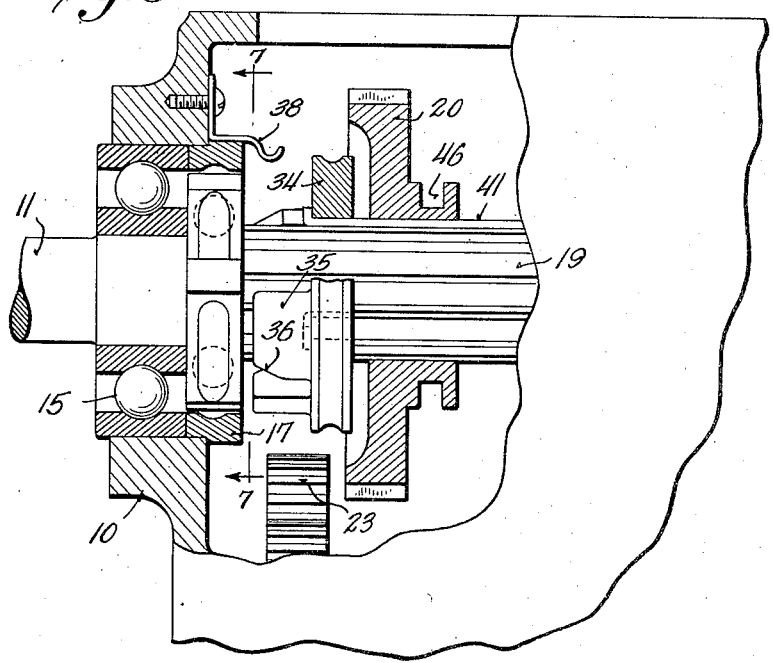
Fig. 6 is a detail sectional view showing certain modifications.
Figure 7:
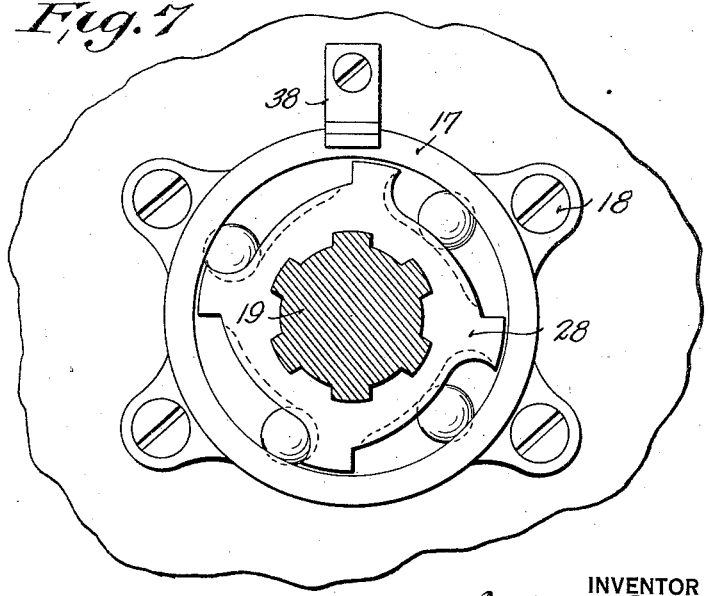
Fig. 7 is a detail sectional view taken on the line 7—7 of Fig. 6.

Referring to the drawings, the numeral 10 designates the casing of a transmission, 11 the driven shaft, and 12 the drive shaft having a pilot bearing 13 formed therein for the driven shaft and journalled in a ball bearing journal 14 mounted in one end of the casing. The front portion of the driven shaft 11 is journalled in a ball bearing journal 15 whose outer race 16 is keyed to the casing 10 and also preferably forms the drum for the no-roll back locking mechanism as shown in Figs. 1, 4, and 5 though this drum may in some instances be made as separate piece 17, as shown in Figs. 6 and 7, secured to the casing 10 by screws 18 which in some transmissions are used to secure the oil guard (not shown) in position.

The driven shaft 11 has a portion 19 upon which the gear members 20 and 21 are slidably mounted and splined, the gear 20 being shiftable to engage a gear 22 on a countershaft (not shown) for lower speed ratio and also to engage an idler gear 23 meshing with another gear (not shown) on said countershaft for reverse while the gear 21 is shiftable into engagement with a gear 24 on said countershaft for the second speed ratio and is provided with an internally toothed face 25 forming one member of a jaw clutch whose other member is the gear 26 formed integral with or secured to the drive shaft 12, said gear 26 meshing with a gear 27 on the countershaft.

A cam member or actuator 28 for the no-roll back is mounted on the splined portion 19 of the driven shaft and has wedge shaped recesses 29 formed therein whose back ends 30 form retainer pockets. Balls 31 are mounted to work in the recesses 29 and the drum heretofore described and form connecting elements between said drum and the actuator when on a reverse rotation of the driven shaft 11 these balls, because of the shape of the recesses, become wedged between the actuator and said drum, it being noted that the balls are free to drop by gravity toward the lower or smaller end of the recesses when the actuator is turned counterclockwise, as viewed in Fig. 2, which occurs when the driven shaft tries to turn the drive shaft when the vehicle tends to roll back on a hill or other incline. When, however, the driven shaft is rotating clockwise, the balls are free and are carried around by the actuator 28 and are retained in the end pockets 30 and are thus practically free from contact with the drum. The bottoms of the recesses 29 are also preferably provided with grooves 32 to provide raceways for the balls and keep them alined with the raceway 33 in the drum.

Thus when the transmission is rotating as in the running of the vehicle, the balls 31 are free, but when the direction of the shaft 11 is reversed, the balls act to automatically lock the shaft 11 to the casing 10 through the actuator 28 and the drum secured to the casing. When so locked, the balls 31 may be released when the transmission is put into reverse and then maintained therein or in any of its lower gear ratios by a release member 34 which is slidably mounted and splined on the shaft 11 and controlled by the shifting movements of the gear members 20 and 21.

The release member 34 is provided with a series of projections 35 adapted to register with the recesses 29 of the actuator and having bevelled or inclined faces 36 adapted to contact the balls 31 and push them out of locking engagement with the locking drum. The member 34 may have an annular groove 37 formed in its hub portion to engage a releasable spring finger 38 secured to the casing when said member 34 is moved to lock release position though this releasable catch is not essential. Certain of the keyways for certain of the splines 39 of the shaft 11 have extensions 40, and long keys 41 are mounted in these extensions and upon the tops of the splines 39. These keys 41 pass through keyways 42 and 43 in the hubs of the gear members 20 and 21, said keyways being extensions of the keyways for said gear members normally receiving the splines 39. Since the actuator is splined to the shaft 11 and the member 34 is splined thereto so that the projections 35 thereof aline with the recesses 29, this relation is always maintained. The long keys 41 provide a lost motion connection between the member 34 and the gear members 20 and 21, the ends 44 of said keys being engageable with the front face of the hub of the member 34 while the other ends 45 of said keys are engageable with the face of the clutch gear 21.

With this construction the hub of the gear member 20 is adapted to abut the hub of the release member 34, so that when the member 20 is shifted toward the left along the shaft 11, the member 34 will be moved in the same direction, and when the member 20 reaches its reverse gear position, the projections 35 will have engaged and moved the balls 31 out of their locking or lockable position, the parts being as shown in Fig. 4. It will, of course, be understood that before the gear member 20 has been shifted to a reverse position, the gear member 21 has been shifted out of direct drive position to a neutral position. If now the operator shifts the gear member 20 to the right to its neutral position, shown in Fig. 5, or still further to the right to bring it into mesh with the gear 22 to establish low gear ratio, he may do so without disturbing the position of the lock release member 34 from its position shown in Fig. 4 since the lost motion connection of the gear 20 relative to the member 34 permits this. If with the gearing in neutral he wishes to shift to second speed ratio, he moves the gear member 21 toward the left as viewed in Fig. 5 to bring it into mesh with the gear 24 and in doing this does not change the position of the member 34 then in its lock release position.

If, however, with the gearing in neutral, low, or second gear position the gear member 21 is shifted from its position shown in Fig. 5 toward the right to bring the clutch portion 25 into engagement with the teeth of the gear 26 to establish direct drive or high gear ratio between the parts 11 and 12, then during this movement this gear member 21 acting through the keys 41 will move the release member 34 out of lock release position into the position shown in Fig. 1, under which conditions the no-roll back will be in position to automatically lock the shaft 11 to the casing 10 in the manner heretofore described. When the gear member 21 is shifted to the high gear position, then the gear member 20 is in a neutral position. Thereafter when the gear member 21 is in neutral position, if the gear member 20 is moved into mesh with the gear 22 for low gear, or if when the gear member 20 is in neutral position the gear member 21 is moved into engagement with the gear 24 for second gear, or both gears 20 and 21 are moved to the neutral position, the automatic no-roll back mechanism will still be effective to automatically lock the shaft 11 against counterclockwise rotation since under these conditions the release member 34 is in a release position such as shown in Fig. 1. It will, therefore, be noted that the no-roll back mechanism is effective on forward speeds and neutral after the release member 34 has been shifted to a release position by putting the transmission in high gear. When as previously noted the gear member 20 is shifted to reverse, the release member becomes effective to release the no-roll back mechanism, and this condition will be maintained if thereafter the operator shifts to the low speeds so that the operator may change from reverse to the low gear ratios without danger of breaking the parts and also since under these conditions when it is locked out in the neutral position, the vehicle may be pushed around without any difficulty.

The gear members 20 and 21 are provided with grooved portions 46 to receive the usual shift levers (not shown) under the control of the operator, said grooved portions thus forming a part of means controlling the shifting of the transmission to its different gear ratios.

It is also to be noted that the sides 35' of the projections 35 are straight and adapted to abut the straight sides 29' of the recesses 29 of the actuator 28 when the release member 34 is moved to release position. This insures a positive release since the actuator, tight on the shaft 11, resists any twisting of the member 34 on its splined connection with said shaft which might cause a binding of the member 20 and prevent its movement along the shaft 19, it being noted that the abutting engagement between the projections 35 and the actuator 28 occurs before any strains are imposed on the member 34 by the engagement of said projections with the balls 31.

I desire it to be understood that this invention is not to be limited to any particular form or arrangement of parts except in so far as such limitations are included in the claim.

What I claim as my invention is:

In a vehicle transmission, the combination of a drive shaft, a driven shaft, change speed gearing between said shafts including a shiftable reverse gear, a clutch including a shiftable clutch member to connect said drive and driven shafts directly together, a no-roll back mechanism for automatically locking said drive and driven shafts against reverse rotation including locking elements, release means for said locking elements, said reverse gear, clutch member and release means all slidably mounted on said driven shaft, and keys operatively connecting said reverse gear, clutch member and release means together for movement of said release means by either said reverse gear or clutch member but in opposite directions.

JOSEPH W. JAGERSBERGER.